(12) United States Patent
Branson et al.

(10) Patent No.: US 9,325,758 B2
(45) Date of Patent: Apr. 26, 2016

(54) RUNTIME TUPLE ATTRIBUTE COMPRESSION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/867,169

(22) Filed: Apr. 22, 2013

(65) Prior Publication Data

US 2014/0317304 A1 Oct. 23, 2014

(51) Int. Cl.
G06F 15/16 (2006.01)
H04L 29/06 (2006.01)
G06F 9/54 (2006.01)

(52) U.S. Cl.
CPC . *H04L 65/60* (2013.01); *G06F 9/54* (2013.01)

(58) Field of Classification Search
CPC ........................................................ H04L 65/60
USPC .................................................. 709/231, 247
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 7,747,585 B2 | 6/2010 | Barsness et al. | |
| 8,095,690 B2 | 1/2012 | Kashiyama et al. | |
| 9,135,057 B2 * | 9/2015 | Branson et al. | |
| 9,183,107 B2 * | 11/2015 | Branson et al. | |
| 2003/0158842 A1 | 8/2003 | Levy et al. | |
| 2004/0022312 A1 * | 2/2004 | Jones et al. | 375/240 |
| 2005/0192978 A1 | 9/2005 | Lightstone et al. | |
| 2006/0179238 A1 * | 8/2006 | Griswell et al. | 711/137 |
| 2008/0133456 A1 | 6/2008 | Richards et al. | |
| 2008/0162523 A1 | 7/2008 | Kraus et al. | |
| 2009/0043734 A1 | 2/2009 | Barsness et al. | |
| 2010/0011012 A1 * | 1/2010 | Rawson | 707/101 |
| 2011/0302226 A1 * | 12/2011 | Abadi et al. | 707/825 |
| 2012/0218268 A1 | 8/2012 | Accola et al. | |
| 2014/0040915 A1 * | 2/2014 | Chen et al. | 718/107 |
| 2014/0215184 A1 * | 7/2014 | Branson et al. | 712/30 |
| 2014/0278338 A1 * | 9/2014 | Kozloski et al. | 703/22 |
| 2014/0280128 A1 * | 9/2014 | Branson et al. | 707/736 |

(Continued)

OTHER PUBLICATIONS

Rea et al., "IBM InfoSphere Streams", 2009, IBM Corporation, all pages.*

(Continued)

*Primary Examiner* — Douglas Blair
(74) *Attorney, Agent, or Firm* — Scott A. Berger

(57) ABSTRACT

A method, system, and computer program product for initializing a stream computing application are disclosed. The method may include receiving a plurality of tuples to be processed by one or more processing elements operating on one or more computer processors. Each processing element may have one or more stream operators. The method may also include determining a first attribute to be processed at a first stream operator that is configured to transmit a tuple having the first attribute along an execution path including at least one intervening stream operator to a second stream operator. The method may include compressing the first attribute when the first attribute is to be next processed by the second stream operator.

5 Claims, 9 Drawing Sheets

(56) References Cited

U.S. PATENT DOCUMENTS

2014/0317148 A1* 10/2014 Branson et al. ............... 707/798
2015/0271236 A1* 9/2015 Chen et al. ................... 370/535

OTHER PUBLICATIONS

"IBM InfoSphere Streams Version 3.2.1: Toolkits: SPL standard toolkit: Utility Operators: Compress", retrieved on Nov. 4, 2015 from http://www-01.ibm.com/support/knowledgecenter/SSCRJU_3.2.1/com.ibm.swg.im.infosphere.streams.spl-standard-toolkit-reference.doc/doc/compress.html.*

Ballard et al., "IBM InfoSphere Streams: Harnessing Data in Motion", Sep. 2010. 360 pages, IBM Redbooks. http://www.redbooks.ibm.com/abstracts/sg247865.html.

Branson et al., "Compile-Time Tuple Attribute Compression", filed Apr. 22, 2013.

Santosuosso et al., "Management System for Processing Streaming Data", Filed Jul. 26, 2011. U.S. Appl. No. 13/190,810.

* cited by examiner

RUNTIME TUPLE ATTRIBUTE COMPRESSION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

In one embodiment, a method for processing a stream of tuples in a stream computing application is described. The method may include receiving a plurality of tuples to be processed by one or more processing elements operating on one or more computer processors. Each processing element may have one or more stream operators. The method may also include determining a first attribute to be processed at a first stream operator that is configured to transmit a tuple having the first attribute along an execution path including at least one intervening stream operator to a second stream operator. The method may include compressing the first attribute when the first attribute is to be next processed by the second stream operator.

In another embodiment, a system for processing a stream of tuples in a stream computing application is described. The system may include one or more processors and a memory containing a program which may be configured to process a stream of tuples. The memory may include a compression manager. The compression manager may be configured to determine a first attribute to be processed at a first stream operator that is configured to transmit a tuple having the first attribute along an execution path including at least one intervening stream operator to a second stream operator. The compression manager may be configured to compress the first attribute when the first attribute is to be next processed by the second stream operator.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
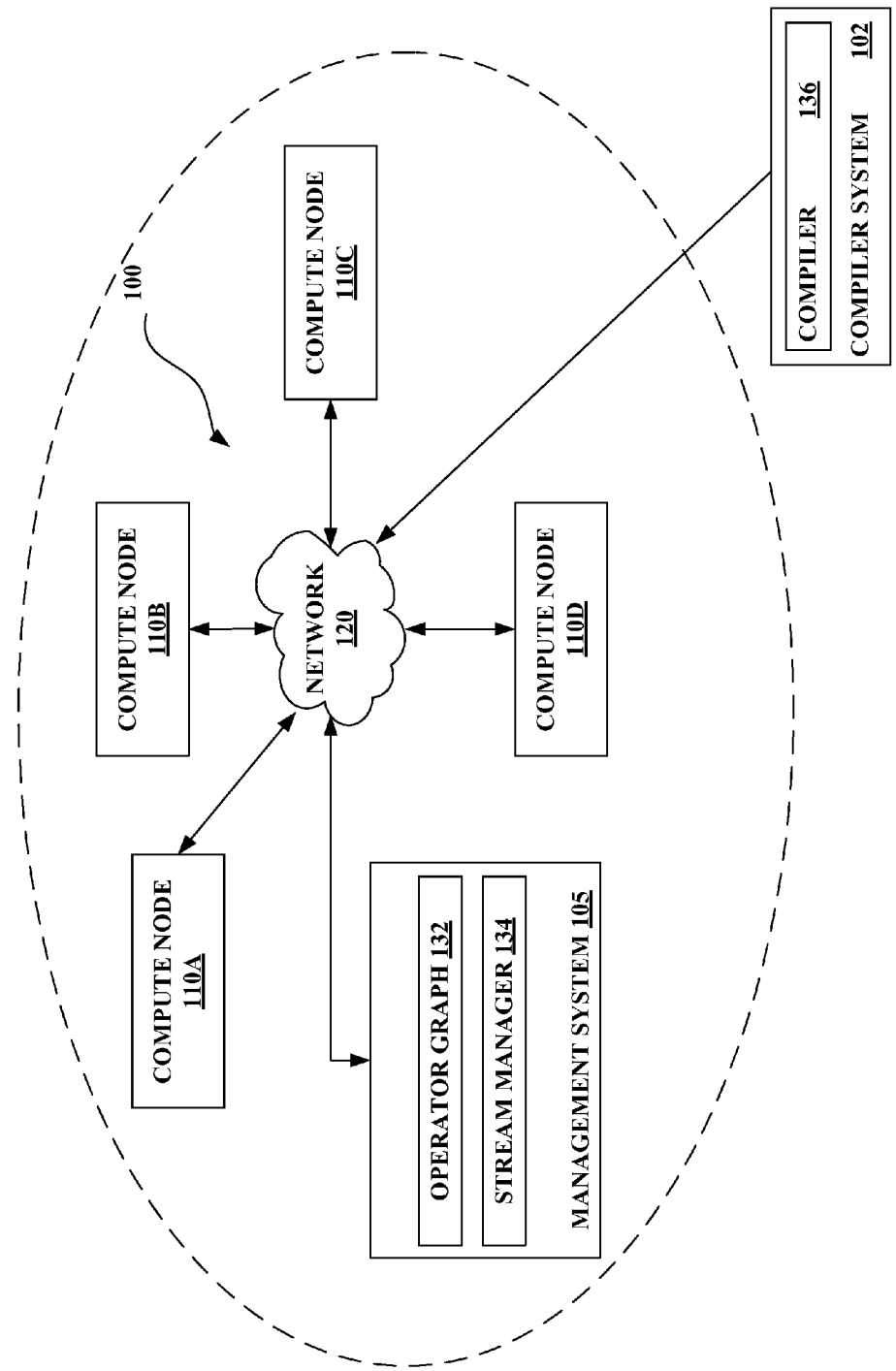
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments of this disclosure are directed to a method and apparatus that may enhance the ability of a stream computing application to efficiently and rapidly process a received data stream. In one embodiment, the method may monitor a stream computing application to determine how the tuple attributes are being processed throughout the operator graph. A stream manager may determine tuple attributes that may be accessed by a stream operator, e.g., in an error condition, but are not in fact being accessed, e.g., because the error condition is not occurring. In various embodiments, the stream manager may determine tuple attributes that are not being used throughout the stream computing application and compress the data associated with that particular tuple attribute after processing the particular attribute at a first stream operator and decompress the particular attribute prior to processing at a second stream operator. Compressing and decompressing the unused tuple attributes may improve the performance of the stream computing application by reducing the size of the data that is being transmitted between stream operators.

FIG. 1 illustrates one exemplary computing infrastructure 100 that may be configured to execute a stream-based computing application, according to various embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
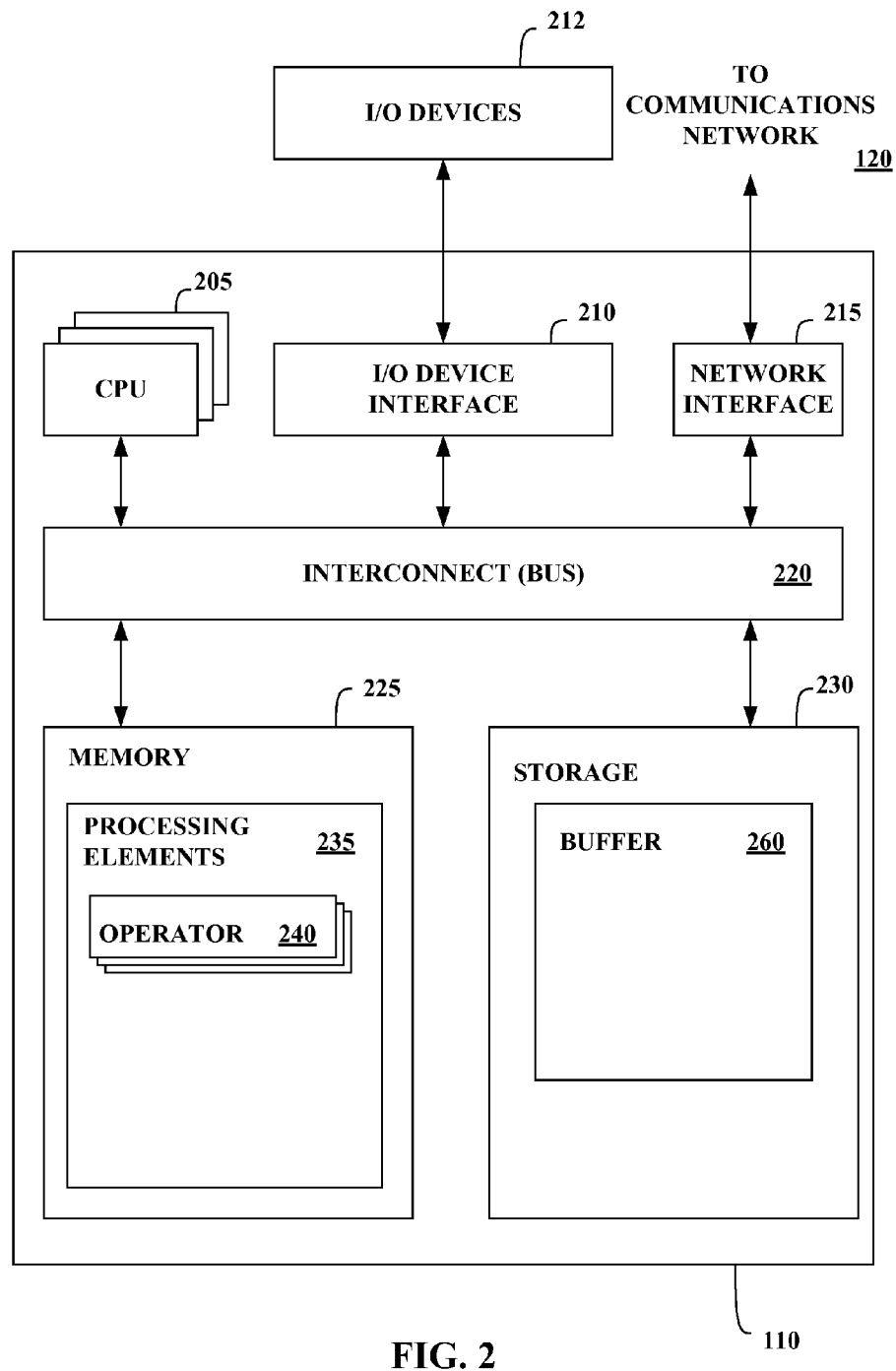
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
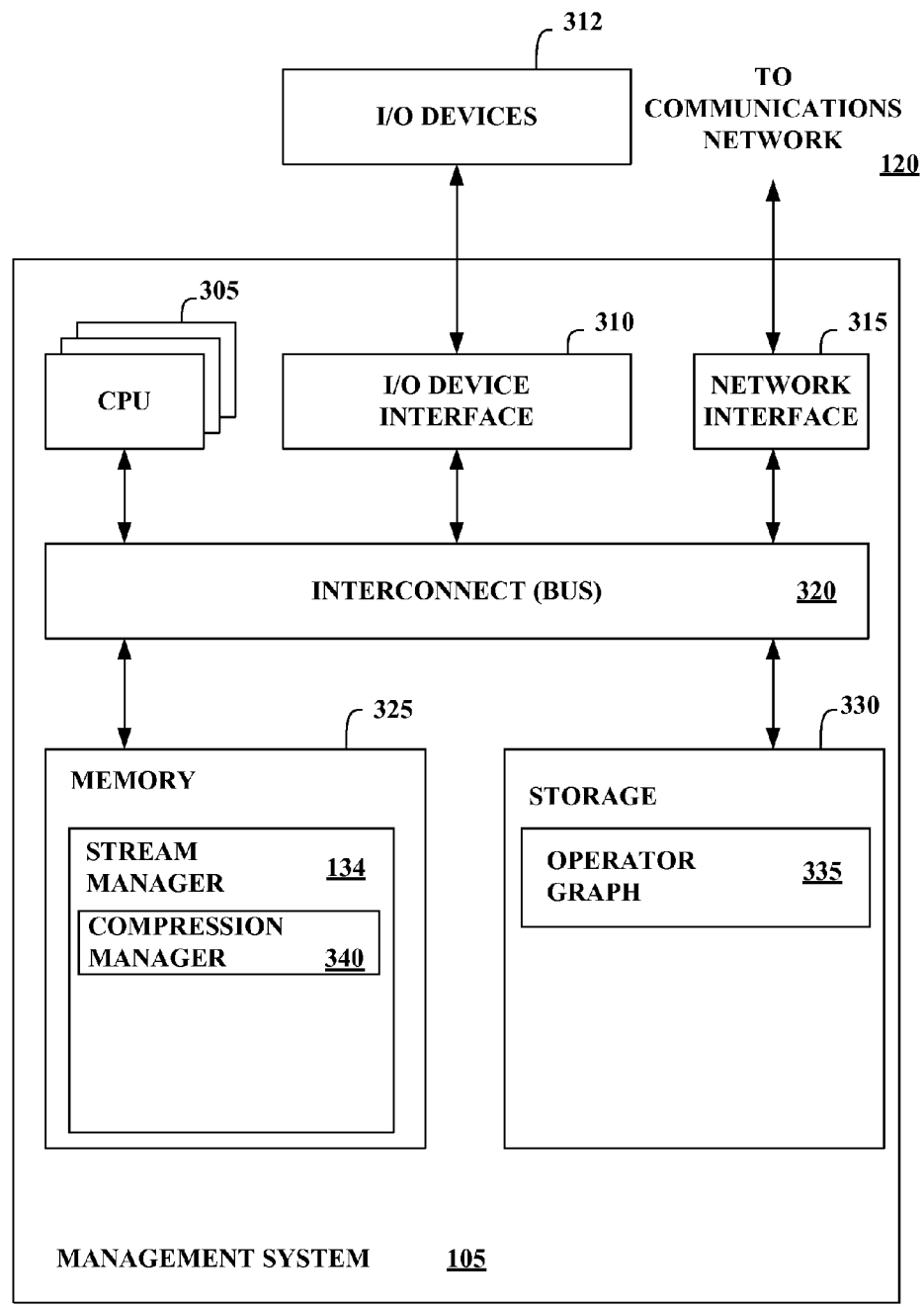
FIG. 3 illustrates a more detailed view of the management system of FIG. 1 according to various embodiments.

FIG. 3 is a more detailed view of the management system 105 of FIG. 1 according to various embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash.

The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. In various embodiments, the stream manager 134 includes a compression manager 340. The compression manager 340 may be configured to monitor tuple attribute usage throughout the stream computing application and compress tuples during the runtime execution of the stream computing application. The compression manager 340 may determine one or more locations within the operator graph 335 at which to compress one or more tuple attributes. The compression manager 340 may compress tuples at the determined locations in various embodiments. The determination of the compression locations may be accomplished by monitoring the stream computing application at runtime. In various embodiments, a compiler (described in further detail in accordance with FIG. 4 below) may provide the compression manager 340 with the locations at which to compress one or more tuple attributes. The compiler may also provide the compression manager 340 the locations at which to decompress and process the tuple attributes. Compressing one or more tuple attributes may improve the performance of the stream computing application by reducing the overall size of the tuple, thereby reducing its use of resources which may be limited, e.g., network bandwidth.

Figure 4:
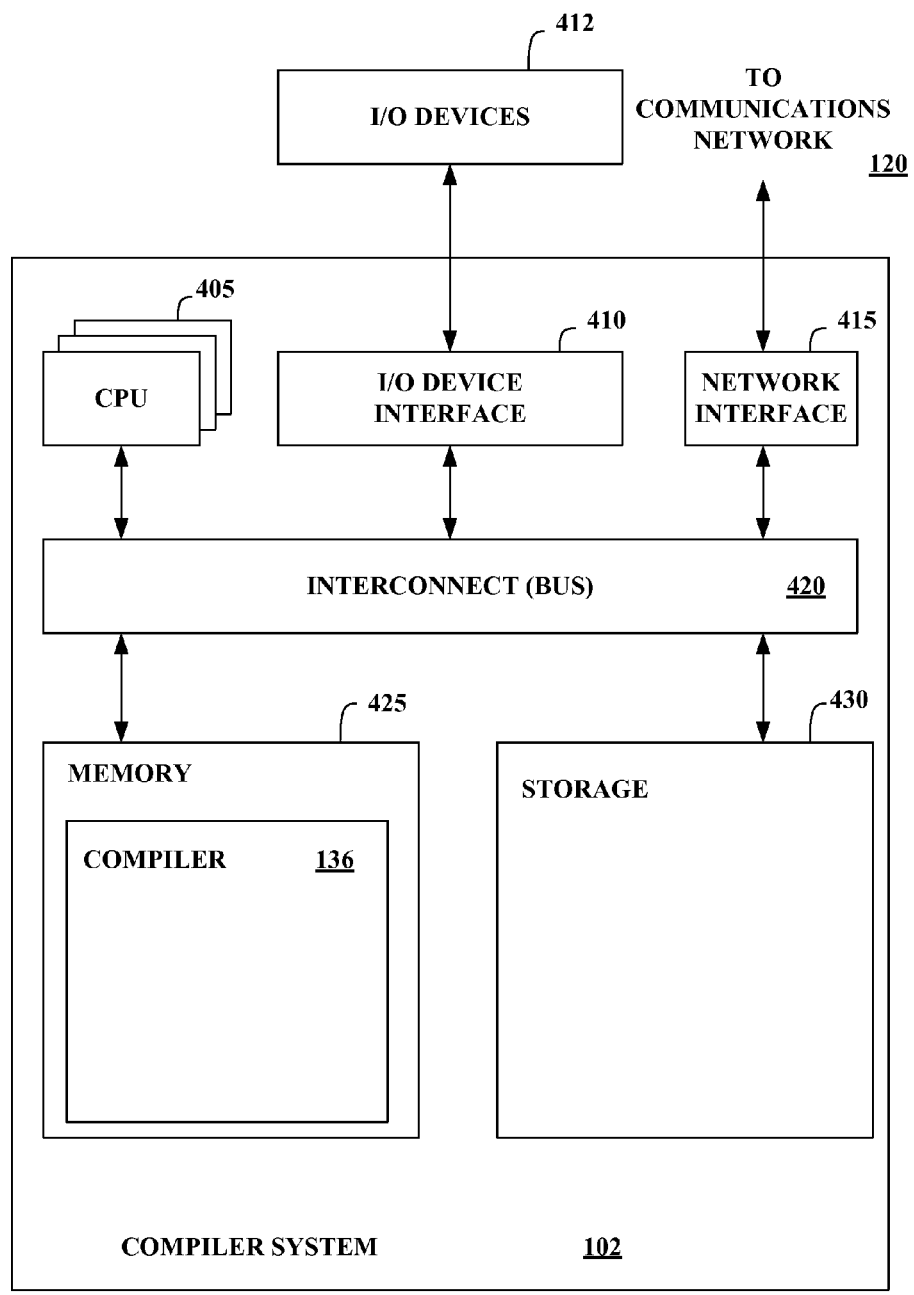
FIG. 4 illustrates a more detailed view of the compiler system of FIG. 1 according to various embodiments.

FIG. 4 is a more detailed view of the compiler system 102 of FIG. 1 according to various embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In various embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
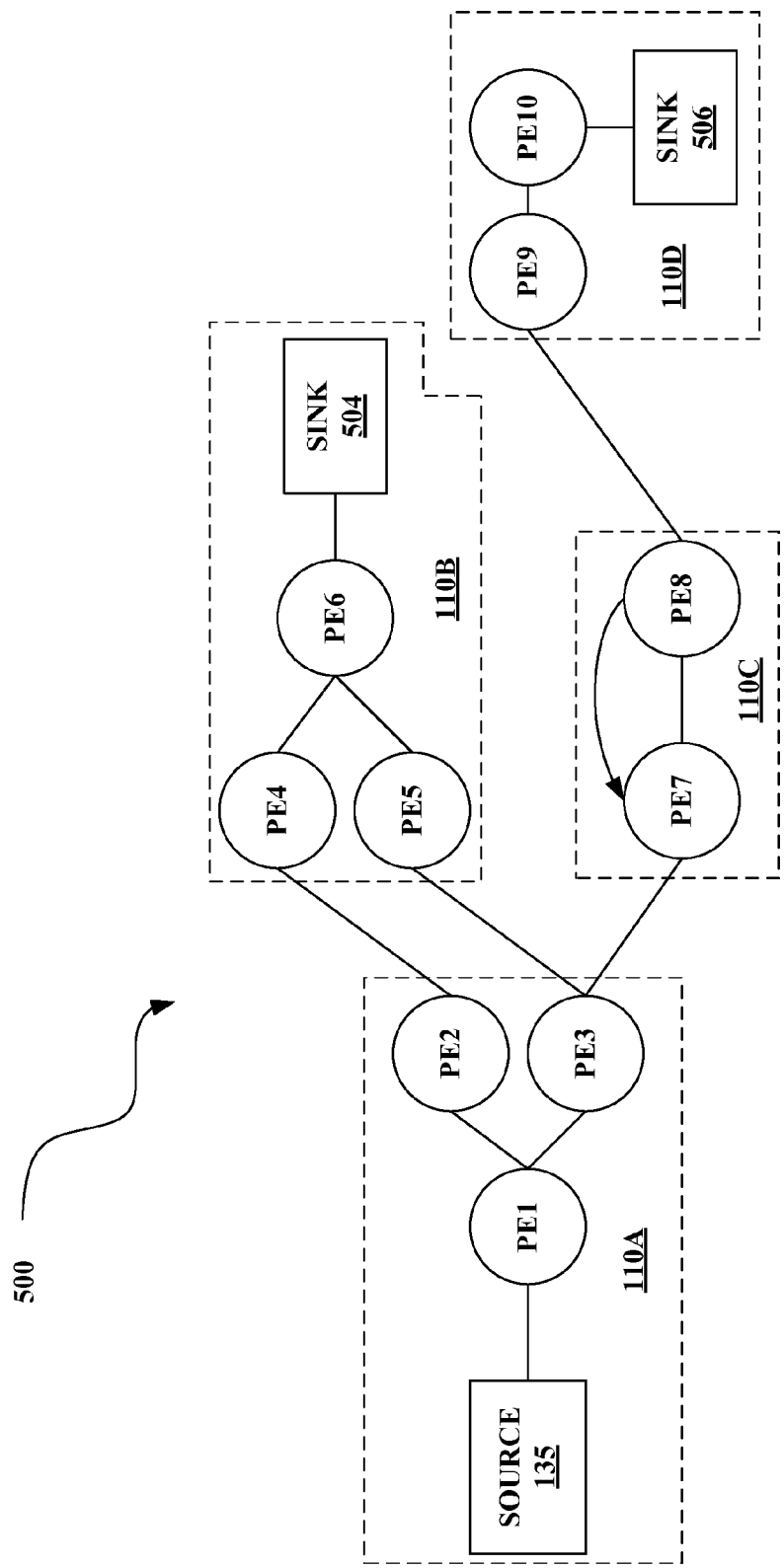
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to various embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
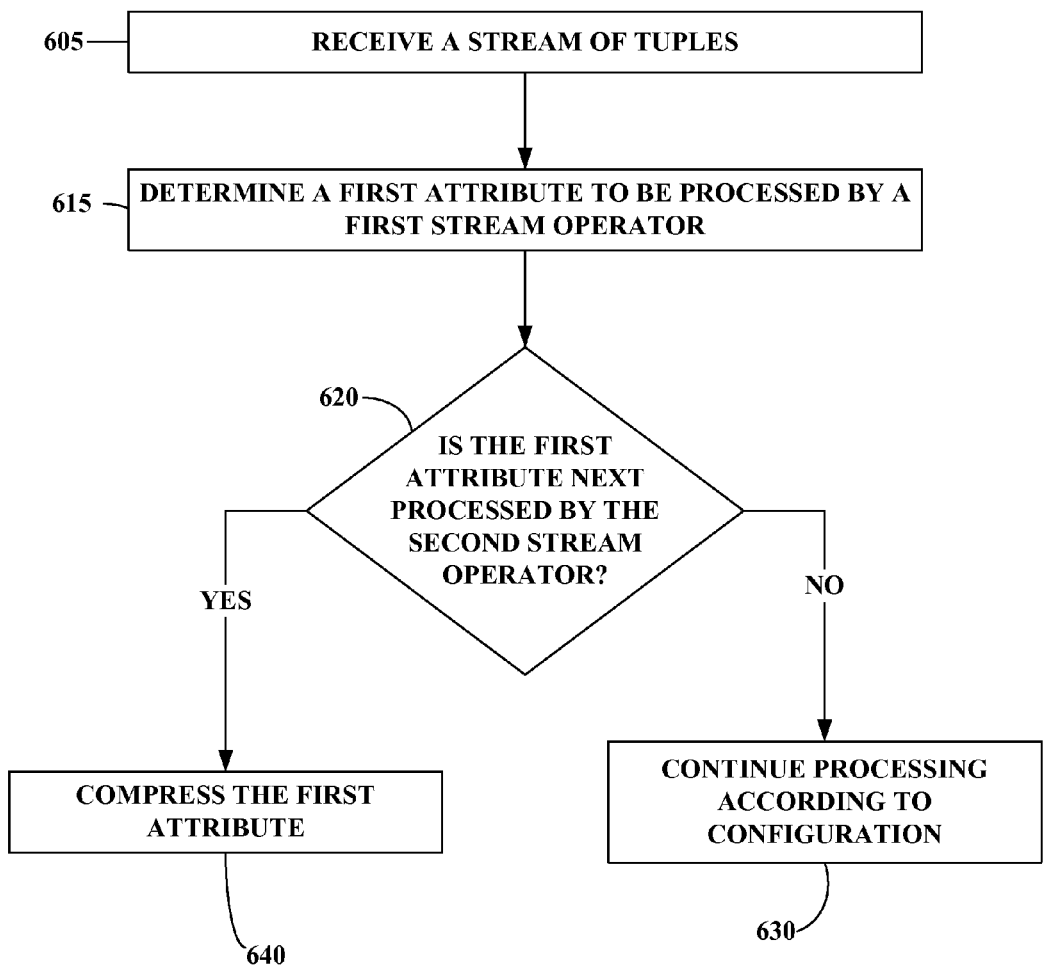
FIG. 6 illustrates a flowchart for a method to compress one or more tuple attributes during runtime execution of a stream computing application, according to various embodiments.

FIG. 6 illustrates a flowchart for a method 600 to compress one or more tuple attributes during runtime execution of a stream computing application, according to various embodiments. The method 600 may begin at operation 605, when a stream computing application receives a stream of tuples. Operation 605 may include one or more additional operations, such as monitoring the stream computing application as the received tuples are processed, according to various embodiments. At operation 615, a compression manager, e.g., compression manager 340 (FIG. 3), determines a first attribute to be processed at a first stream operator. If the first attribute is processed by a first stream operator and next processed by a second stream operator the first attribute may be compressed in some embodiments. The first stream operator may be configured to transmit a tuple having the first attribute along an execution path including at least one intervening stream operator to the second stream operator. An intervening stream operator may include one or more stream operators that examines or evaluates a tuple attribute without processing the tuple attribute. The first stream operator may be at any location within an operator graph. That is, the first attribute may be processed prior to the first stream operator by one or more stream operators. The first attribute may be at any location within the tuple, i.e., it does not have to be the first of the attributes of the tuple.

In various embodiments, determining the first attribute may be based on an output of a compiler, e.g., compiler 136 (FIG. 4). In other embodiments, the compression manager 340 may determine the first attribute based on the runtime execution of the stream computing application. For example, the compression manager 340 may monitor the stream computing application and determine one or more locations within the operator graph at which an attribute may be compressed. At operation 620, the compression manager 340 may determine whether the first attribute is to be next processed at the second stream operator. If the first attribute is processed at the first stream operator and next processed at the second stream operator the compression manager 340 may compress the first attribute. The first attribute may be compressed after processing by the first stream operator. In some embodiments, this may be the first stream operator completing the processing. In other embodiments, the compressing may be completed by one of the intervening stream operators along the execution path between the first stream operator and the second stream operator. In various embodiments, the compression manager 340 may determine not to compress the first attribute based on one or more computing resource limitations, e.g., CPU availability is below a threshold (discussed in further detail in accordance with FIG. 7 below). Conversely, the compression manager 340 may continue processing according to the configuration of the stream computing application in operation 630 when the first attribute is not processed next by the second stream operator.

Figure 7:
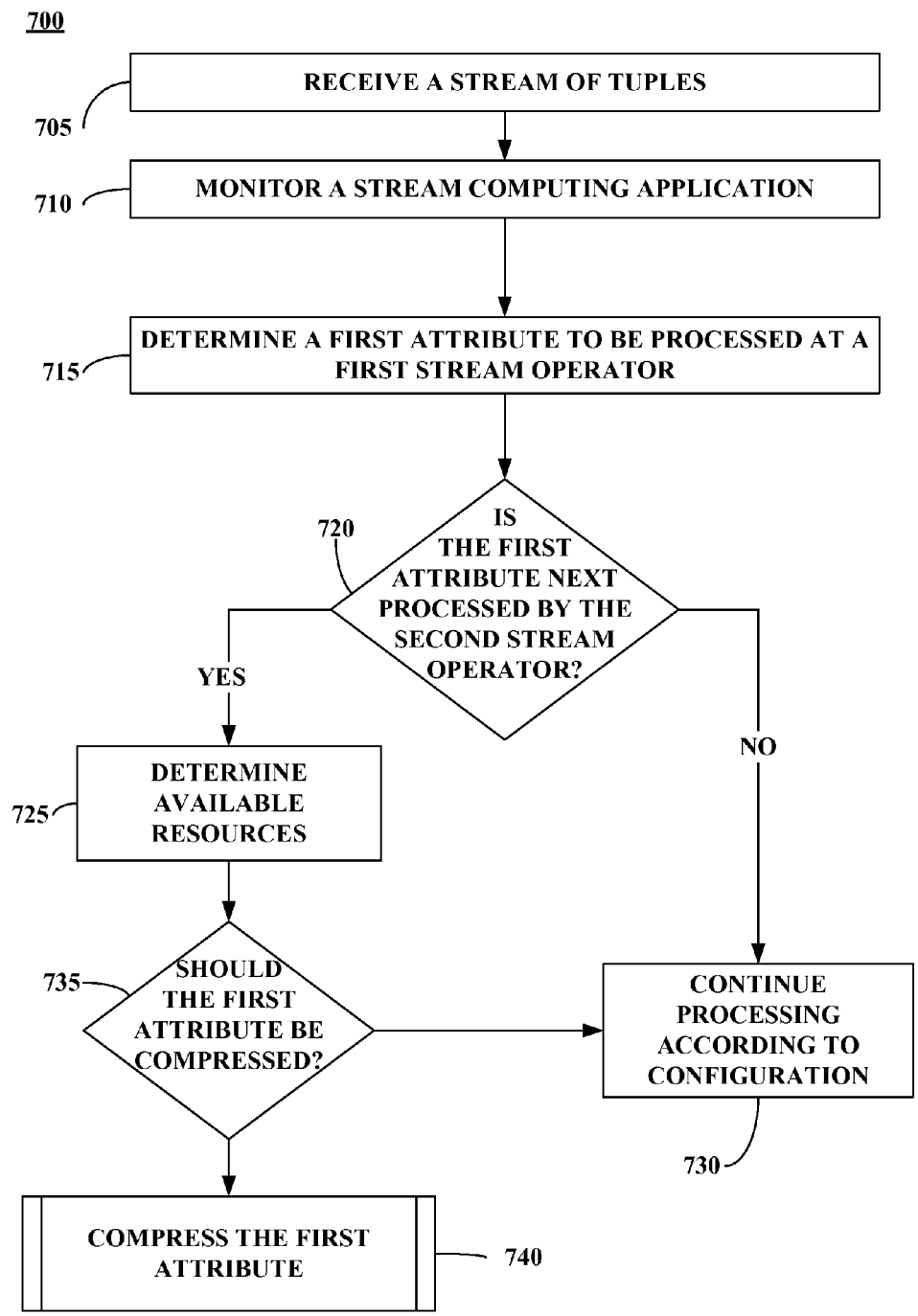
FIG. 7 illustrates a flowchart for a method to compress one or more tuple attributes during runtime execution of a stream computing application, according to various embodiments.

FIG. 7 illustrates a flowchart for a method 700 to compress one or more tuple attributes during runtime execution of a stream computing application, according to various embodiments. Aspects of FIG. 7 may be the same as or similar to aspects of FIG. 6. At operation 705, a stream computing application may receive a stream of tuples during its runtime execution, according to various embodiments. At operation 710, a compression manager, e.g., compression manager 340 (FIG. 3), may monitor the stream computing application. The compression manager 340 may be configured to monitor the stream computing application during its runtime execution to determine tuple attributes which may be compressed. Compressing tuple attributes may improve the performance of the stream computing application by reducing the size of the tuple, thereby reducing the network resources consumed to transmit the tuple with one or more compressed attributes.

At operation 715, the compression manager 340 may determine a first attribute to be processed at a first stream operator that is configured to transmit a tuple having the first attribute along an execution path including at least one intervening stream operator to a second stream operator. The compression manager 340 may determine the first attribute based on the runtime performance of the stream computing application in various embodiments. In other embodiments, determining the first attribute may be completed at compile time and the compression manager 340 may compress the first attribute based on the input conditions supplied by the compiler, e.g., compiler 136 (FIG. 4).

The compression manager 340 may maintain a map of tuple attributes and the corresponding stream operators at which the particular tuple attributes are processed. In various embodiments, the compression manager 340 may generate this map during runtime. In other embodiments, the map may be generated by the compiler 136 at compile time and modified during runtime by the compression manager 340. The compression manager 340 may modify this map based on the performance of the application. For example, the map may initially indicate the stream operators at which each tuple attribute may be processed, but be modified to indicate whether the tuple attribute is actually processed at a particular stream operator. This may, for instance, happen when a tuple attribute is only accessed in the case of an error condition, but during runtime the error condition does not generally occur.

At operation 720, the compression manager 340 determines whether the first attribute is to be next processed at the second stream operator. If the first attribute was determined at operation 715, then the method 700 may continue to operation 725, in which the compression manager 340 determines the resources available to the stream computing application. Operation 725 may include gathering information about whether there are resources available for the compression manager 340 to compress the first attribute determined at operation 715. Accordingly, this may include obtaining statistics, such as whether CPU resources are available to add compression and decompression, whether the network bandwidth is low, or other similar information that may inform the determination of the compression manager 340 to compress tuple attributes. If, at operation 720, no compression conditions exist, then the method 700 may continue at operation 730. At operation 730, the compression manager 340 may not modify the application and continue processing as currently configured.

At operation 735, the compression manager 340 may determine whether to compress the first attribute. This may be based on the available resources as determined in operation 725. For example, if the network bandwidth is outside a threshold, the compression manager 340 may not compress the first attribute. The network bandwidth threshold may be a system provided value that a user or application programmer may override. Similarly, if the CPU resources or memory accessible to the stream computing application is outside a threshold, the compression manager 340 may compress the first attribute. The CPU or memory resource threshold may be a system provided value that a user or application programmer may override. If the compression manager 340 does not compress the first attribute, then the method 700 may continue to operation 730, in which the compression manager 340 does not modify the application and continues processing as currently configured.

If, however, the compression manager 340 determines that there are either available CPU or memory resources, or that the network resources are below a threshold, then the compression manager 340 may compress the first attribute. The method 700 may proceed with operation 740 in which the compression manager 340 compresses the first tuple attribute based on the one or more compression conditions. The details of operation 740 will be described in further detail in accordance with FIG. 8 below.

Figure 8:
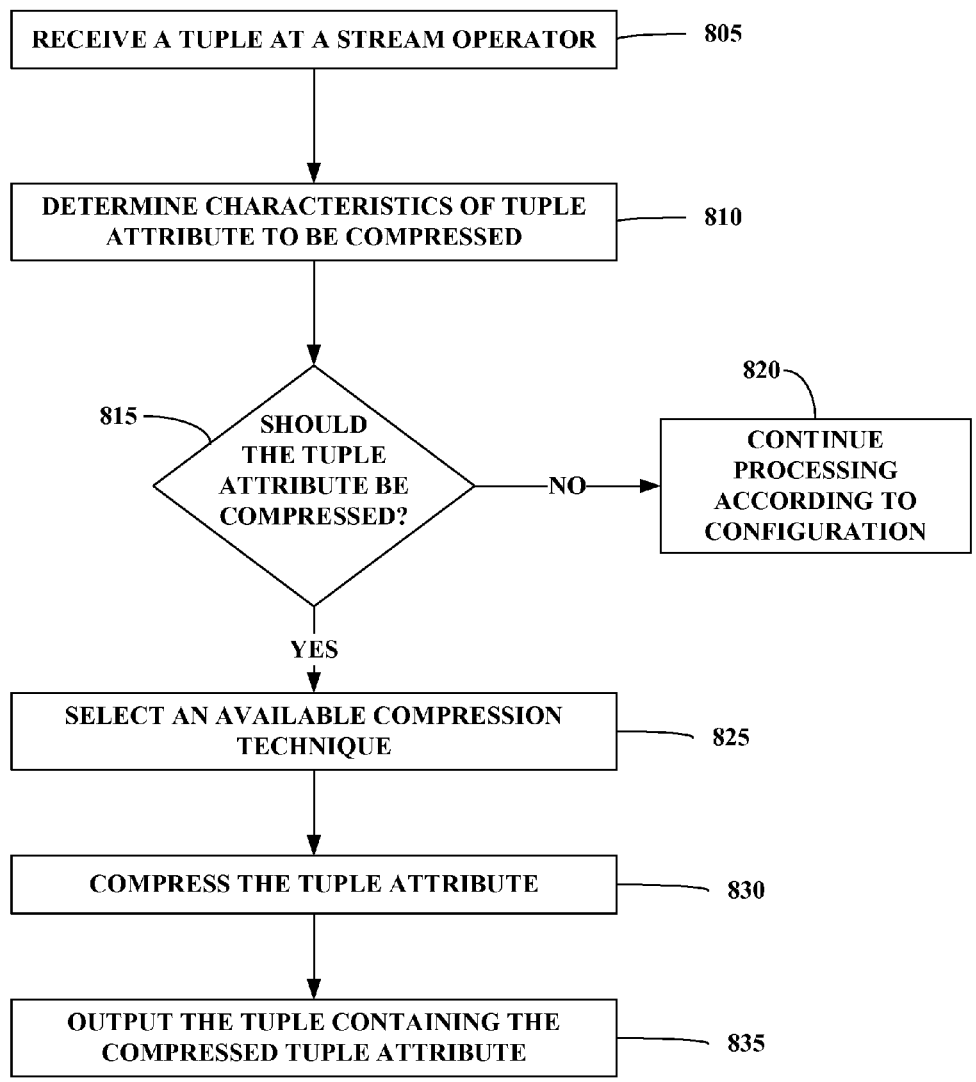
FIG. 8 illustrates a flowchart for a method to determine how to compress one or more tuple attributes corresponding to the method of FIG. 7, according to various embodiments.

FIG. 8 illustrates a flowchart for a method 800 to determine how to compress one or more tuple attributes corresponding to the method 700 of FIG. 7, according to various embodiments. The method 800 describes the compression of one or more tuple attributes of operation 740 in further detail.

The method 800 may begin at operation 805 in which the first stream operator receives a tuple, according to various embodiments. Upon receiving the tuple, one or more characteristics of the tuple attribute corresponding to the first attribute may be determined in operation 810. Operation 810 may include determining the features of the first attribute that may indicate whether the first attribute should be compressed. Determining the characteristics may include reading the metadata associated with the candidate tuple. In other embodiments, determining the characteristics may include determining the type and size of the first attribute within the tuple. Additional characteristics of the first attribute may be determined if they will better inform the determination of whether to compress the first attribute.

At operation 815, the compression manager 340 may determine whether the first attribute should be compressed. Operation 815 may rely on the one or more characteristics of the first attribute as determined in operation 810. In various embodiments, the first attribute should be compressed if the size of the tuple attribute is outside a threshold. The threshold may be a system provided value that a user or application programmer may override. In other embodiments, the first attribute should be compressed if it is of a certain type. For example, a tuple attribute containing only text strings may not be compressed, whereas a tuple attribute containing images, audio, or video may be compressed. The type of the first attribute corresponding to a determination to compress may be system provided values that a user or application programmer may override. If the first attribute should not be compressed, the compression manager 340 may not apply any compression to the first attribute and continue processing the first attribute according to the configuration of the stream computing application.

If, however, the first attribute should be compressed (as determined in operation 815), the compression manager 340 may select an available compression technique. The compression manager 340 may use the information determined in operation 810 to constrain the choice of compression technique. For example, the determination of operation 825 may select a compression technique based on the type of the first attribute in various embodiments. Operation 825 may also consider how computationally intensive a particular technique is and accordingly the amount of time and/or resources that may be required to run the technique. In various embodiments, operation 825 may consider whether a lossy or lossless compression technique is appropriate for the type of data contained within the first attribute. For example, lossy compression may be acceptable for an attribute containing images, but may not be acceptable for a tuple attribute containing account numbers. Operation 825 may also consider the amount of compression that is available from a particular technique. Other similar considerations may affect the type of compression technique selected in operation 825. Once a compression technique is selected in operation 825, the compression manager 340 may compress the first attribute in operation 830.

Figure 9:
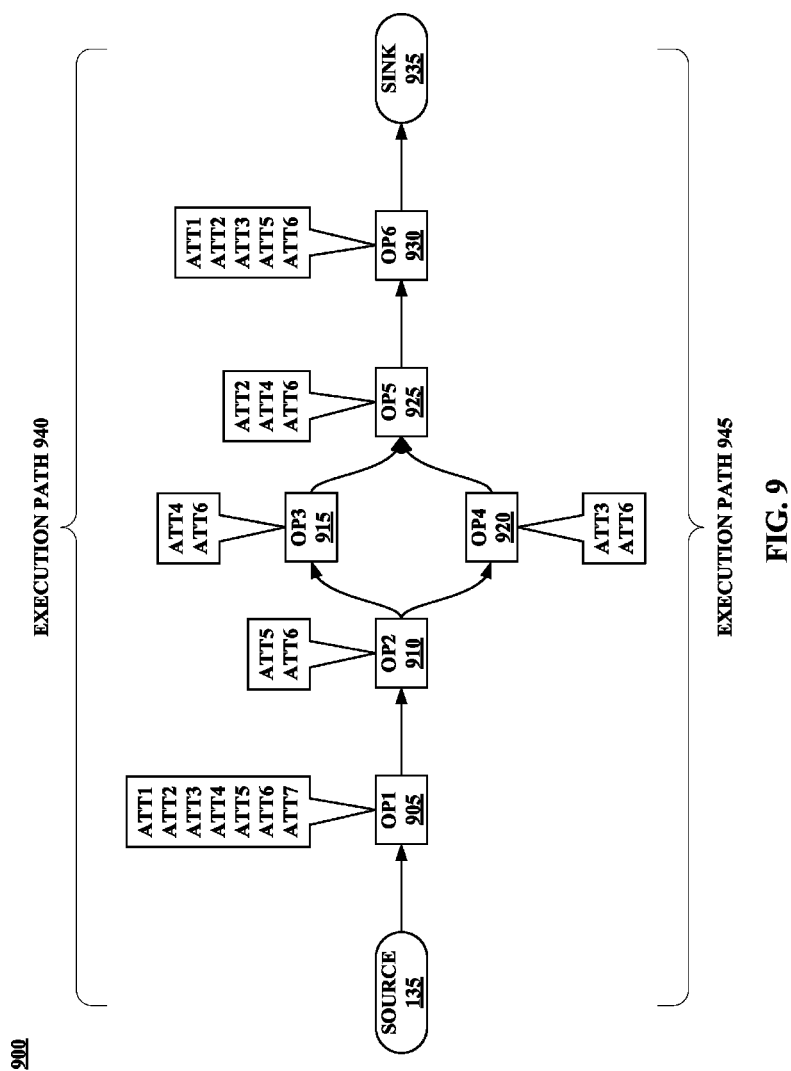
FIG. 9 illustrates an operator graph including a listing of each attribute that is to be processed by the particular stream operators, according to various embodiments.

FIG. 9 illustrates an operator graph 900 including a listing of each attribute that is to be processed by the particular stream operators, according to various embodiments. The operator graph 900 includes simplified execution paths for illustrative purposes.

The operator graph 900 contains a source 135, six stream operators 905, 910, 915, 920, 925, and 930, and a sink 935. Other embodiments may include additional stream operators and/or additional execution paths. The operator graph 900 includes two potential execution paths: execution path 940 starts at the source 135, and proceeds from stream operator 905 to 910 to 915 to 925 to 930 and ends at sink 935; execution path 945 starts at the source 135 and proceeds from stream operator 905 to 910 to 920 to 925 to 930 and ends at sink 935. In the illustrated embodiment, the two execution paths 940, 945 complete slightly different processing, as illustrated by the stream operators 915 and 920 processing different attributes. In other embodiments, the execution paths may be configured to process the same attributes as a way of load balancing the processing in the stream computing application.

The execution path 940 begins with a source 135. The source provides the stream of tuples to the stream operator 905. The stream operator 905 is configured to process attributes ATT1, ATT2, ATT3, ATT4, ATT5, ATT6, and ATT7. After processing, the stream operator 905 may transmit a tuple to stream operator 910. The stream operator 910 is configured to process attributes ATT5 and ATT6 and to transmit the resulting tuple to stream operator 915. The stream operator 915 is configured to process attributes ATT4 and ATT6 and to transmit the resulting tuple to stream operator 925. The stream operator 925 is configured to process attributes ATT2, ATT4, and ATT6 and to transmit the resulting tuple to stream operator 930. The stream operator 930 is configured to process attributes ATT1, ATT2, ATT3, ATT5, and ATT6 and to transmit the resulting tuple to sink 935.

The execution path 945 begins with the source 135. The source provides the stream of tuples to the stream operator 905. The stream operator 905 is configured to process attributes ATT1, ATT2, ATT3, ATT4, ATT5, ATT6, and ATT7. After processing, the stream operator 905 may transmit a tuple to stream operator 910. The stream operator 910 is configured to process attributes ATT5 and ATT6 and to transmit the resulting tuple to stream operator 920. The stream operator 920 is configured to process attributes ATT3 and ATT6 and to transmit the resulting tuple to stream operator 925. The stream operator 925 is configured to process attributes ATT2, ATT4, and ATT6 and to transmit the resulting tuple to stream operator 930. The stream operator 930 is configured to process attributes ATT1, ATT2, ATT3, ATT5, and ATT6 and to transmit the resulting tuple to sink 935.

In the shown embodiment, the compression manager 340 (FIG. 3) may determine that the attribute ATT5 is capable of being processed by the stream operator 910. The compression manager 340 may also determine that during runtime, the attribute ATT5 is only accessed at the stream operator 910 when an error condition is satisfied, and the error condition is not generally satisfied. Accordingly, the compression manager 340 may determine that the attribute ATT5 is first processed at the stream operator 905, and next processed at the stream operator 930. Accordingly, the compression manager 340 may determine that the attribute ATT5 may be compressed after processing the attribute ATT5 at the stream operator 905 and decompressed prior to processing the attribute ATT5 at the stream operator 930. The compression manager may, in accordance with methods 600-800, compress the attribute ATT5.

In various embodiments, the tuple having the compressed attribute ATT5 may be decompressed at the stream operator 930. In other embodiments, the compression manager 340 may determine that the stream operator 930 is building up a backlog of tuples to be processed. This may be due to the additional time to decompress the attribute ATT5. In various embodiments, if the number of tuples queued exceeds a threshold, the compression manager 340 may decompress the tuple attribute at a stream operator along an execution path that routes the tuple to the stream operator 930. For example, if the stream operator 925 does not have any tuples waiting to be processed, i.e., the stream operator has additional processing capacity, the compression manager 340 may decompress the tuple attribute prior to sending the tuple from stream operator 925 to stream operator 930.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, various embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for processing tuples, comprising:
receiving a plurality of tuples to be processed by one or more processing elements operating on one or more computer processors, each processing element having one or more stream operators;
determining a first attribute to be processed at a first stream operator, the first stream operator configured to transmit a tuple having the first attribute along an execution path including at least one intervening stream operator to a second stream operator;
processing the tuple having the first attribute at the first stream operator;
compressing, in response to the processing, the first attribute when the first attribute is to be next processed by the second stream operator;
transmitting the tuple having the first attribute along the execution path, in response to the compressing the first attribute, and
decompressing the first attribute prior to processing the second stream operator.

2. The method of claim 1, wherein the compressing the first attribute is enabled when at least one of network bandwidth is within a threshold and a processing resource is outside a threshold.

3. The method of claim 1, wherein the determining the first attribute is performed by a compiler at compile time.

4. The method of claim 1, wherein the determining the first attribute is performed by a compression manager at runtime.

5. The method of claim 1, the compressing the first attribute further comprising:
- determining one or more characteristics of the first attribute; and
- selecting a first of a plurality of compression techniques, wherein the one or more characteristics of the first attribute identify a preference for lossy or lossless compression.

* * * * *